United States Patent [19]
Stockmann et al.

[11] 4,362,357
[45] Dec. 7, 1982

[54] OPTICAL STAR COUPLER FOR MULTI-MODE LIGHT CONDUCTING FIBERS

[75] Inventors: Michael Stockmann; Hans-Hermann Witte, both of Munich, Fed. Rep. of Germany

[73] Assignee: Siemens Aktiengesellschaft, Berlin & Munich, Fed. Rep. of Germany

[21] Appl. No.: 136,423

[22] Filed: Apr. 2, 1980

[30] Foreign Application Priority Data

Apr. 12, 1979 [DE] Fed. Rep. of Germany ....... 2915114

[51] Int. Cl.³ ............................................. G02B 7/26
[52] U.S. Cl. .................................. 350/96.16; 350/320
[58] Field of Search ............... 350/96.12, 96.15, 96.16, 350/96.20, 96.22, 320; 156/157, 158

[56] References Cited

U.S. PATENT DOCUMENTS

| | | | |
|---|---|---|---|
| 4,184,740 | 1/1980 | d'Auria et al. | 350/96.16 |
| 4,193,661 | 3/1980 | d'Auria et al. | 350/96.16 |
| 4,200,356 | 4/1980 | Hawkes et al. | 350/96.16 |
| 4,213,670 | 7/1980 | Milton et al. | 350/96.16 |
| 4,305,641 | 12/1981 | Witte | 350/96.15 |

FOREIGN PATENT DOCUMENTS 2005045  4/1979  United Kingdom .

OTHER PUBLICATIONS

Hudson et al., "The Star Coupler: A Unique Interconnection Component . . . ," *Applied Optics*, vol. 13, No. 11, Nov. 1974, pp. 2540-2545.
Auracher et al., "Optimized Layout for a Data Bus System . . . ," *Applied Optics*, vol. 16, No. 12, Dec. 1977, pp. 3140-3142.
Tangonan et al., "Planar Multimode Couplers for Fiber Optics," *Optics Commun.*, vol. 27, No. 3, Dec., 1978, pp. 358-360.
Schott Informationen, No. 4, 1978, pp. 21-22.
A. F. Milton et al., "Star and Access Couplers for Multichannel Fiber Cables", *IEEE J. Quantum Electronics*, vol. QE-13, No. 9 (9/1977) p. 21D.

*Primary Examiner*—John D. Lee
*Attorney, Agent, or Firm*—Hill, Van Santen, Steadman, Chiara & Simpson

[57] ABSTRACT

A three dimensional star coupler for interconnecting a first bunch of optical waveguides such as fibers to a second bunch of optical waveguides or optical fibers characterized by a mixing element being a planar waveguide having a thickness approximately equal to the fiber diameter and having input and output surfaces coupled to the incoming and outgoing fibers which are all supported in the same plane. The mixing element consists for example of an elongated rectangular plate but also can have a configuration of arcs of a circular configuration.

6 Claims, 3 Drawing Figures

OPTICAL STAR COUPLER FOR MULTI-MODE LIGHT CONDUCTING FIBERS

BACKGROUND OF THE INVENTION

The present invention is directed to an optical star coupler for multi-mode light conducting fibers wherein two groups of light conducting fibers are connected to one another by a mixing element. In the coupler, a packing density of each group of fibers at the input and the output of the mixing element is to be as great as possible.

A coupler which has at least an input and output group of fibers interconnected by a mixing element is known and an example is disclosed in an article by Marshall C. Hudson et al, "The Star Coupler: A Unique Interconnection Component for Multimode Optical Waveguide Communication Systems", *Applied Optics*, Vol. 13, No. 11, November 1974, pp. 2540–2545. These types of couplers are of a great significance in optical communication technology. They contain fibers, which run towards a common nodal point and from which an equal number of fibers re-emerge. The light from an incoming fiber is to be distributed between all of the outgoing fibers as uniformly as possible and with the least possible losses. In particular, when a large number of terminals are to be supplied, the use of star couplers results in smaller overall losses than in a T-shaped arrangement, which is also well known. Consequently, the dynamic range on the receiver side can be contrived to be smaller. In addition, the star-shaped arrangement is more resistant to total breakdown. In the known three dimensional star coupler, an increasing number of fibers result in an increasing technical outlay in order to obtain a high packing density of the fibers in the mixing element. At the same time, it must be ensured that each fiber is aligned and parallel to the axis of the rod-shaped mixing element. On account of these technical requirements, known star couplers, which are used in practice, will exhibit insertion losses which considerably exceed the theoretical values.

SUMMARY OF THE INVENTION

The present invention is directed to providing a star coupler wherein two groups of light conducting fibers are connected to one another by a mixing element and the coupler involves comparatively slight insertion losses, can be manufactured economically in a simple technology, and is consequently suited for production in large numbers.

These tasks are obtained in an improvement in an optical star coupler for multimode light conducting fibers including a mixing element having an input and output end for interconnected two groups of light conducting fibers with the packing density of each group of fibers at the input and output ends being as high as possible. The improvement comprises the mixing element being a planar waveguide having a thickness approximately equal to the diameter of the fibers and having an input end and output end coupled to the incoming and outgoing fibers, and means for positioning the mixing element and the incoming and outgoing fibers in the same plane.

In this type of star coupler, the optimum packing density is achieved when all the fibers located in one plane contact one another and this is technically easy to achieve. If as is usual in planar technology, the fibers and the mixing element are arranged on a common substrate, the axial alignment of the fibers to the mixing elements is also assured. Under the simplest circumstances, the mixer element can consist of an elongated rectangular shaped plate for example a glass plate which is polished on all side edges. The width will amount to N times the fiber diameter wherein N is the number of incoming and outgoing fibers. The mixing of the modes, which are conducted in the plate, increases in proportion to its length.

It is advantageous in an embodiment of the invention to provide the plate which between the input and output ends has been waisted. This can be achieved for example in a rectangular plate by grinding away circular portions on the longitudinal sides or edges extending between the end faces and then polishing the ground edges. Such an arrangement will increase the mixing of the element.

Mixing of all modes can also be achieved by means of a circular configuration for the mixing element. Here again the degree of mixing increases in proportion to the length of the circle. Semi-circles, which can also be assembled in a meandering fashion, also offer the advantage that the input side and the output side of the mixing element can be processed simultaneously.

The following known possibilities can be used to produce these mixing elements. A planar mixing element of arbitrary shape can be produced from a photosensitive glass in a known photolithographic process. An example of a known photolithographic process is disclosed in *Schott Informationen*, No. 4, 1978, pp. 21–22. A second method is to produce the mixer element by ion exchange in a quartz glass crystal. The shape of the mixer is determined by the application of aluminum mask and known technique is disclosed by G. L. Tangonan et al, "Planar Multimode Couplers For Fiber Optics", *Optical Communications*, Vol. 27, No. 3, December 1978, pp. 358–360.

Arbitrary mixing element shapes can be produced by means of a thick film technology. For example, a negative of the desired mixture structure having a thickness of the fibers is photolithographically applied to a substrate, such as quartz glass, the shape in the negative is then filled with an optical adhesive, whose index or refraction is higher than that of the substrate. A cover, which consists for example of a material of a substrate, is then pressed into position in order to protect the structure and to ensure that the adhesive thickness is as equal as possible to the fiber diameter. When the adhesive has hardened and if necessary the negative shape is removed and the adhesive can assume the function of the waveguide.

In order to produce a semicircular mixing element, it is advantageously proposed that a glass rod be used which is first drilled to form a tube having a wall thickness corresponding to the width of the mixer element. It is also possible to use an appropriately premanufactured glass tube. Then the tube is split in a plane extending through the axis to form two equal halves. The cut edges are then polished and the mixing element can then be sawed from these halves by cutting in a plane extending at right angles to the tube axis to form a member which is subsequently ground to the required thickness of the mixer element and polished. This final grinding and polishing procedure can be carried out simultaneously on a large number of discs. In the same way as for a mixer element which is produced by different procedures, the outer surface of the mixer element must be protected from dust and damage in order to prevent stray losses of the conducted light waves. For this purpose the mixing element is cast for example with an optical adhesive which has an index of refraction $n_{adhesive} < n_{mixer}$.

Another possiblity of processing the solid glass rod is to split the rod along its axis and then grind away the material of both halves from the rod axis until the halves of the tube achieve a wall of the desired thickness. In both procedures, a plurality of identical mixer elements are achieved in a simple manner.

DESCRIPTION OF THE PREFERRED EMBODIMENTS

Figure 1:
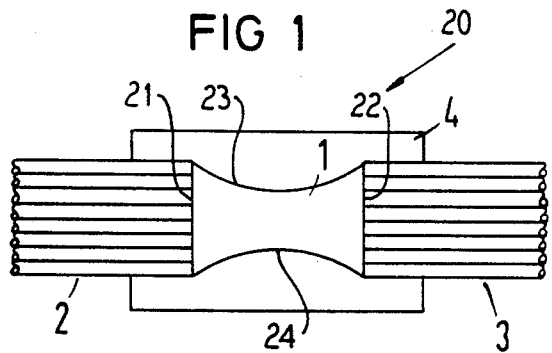
FIG. 1 is a plan view of a star coupler according to the present invention with the waisted mixing element; the mixing element can also be an elongated rectangular shaped plate.

The principles of the present invention are particularly useful in a coupler, such as a star coupler generally indicated at 20 in FIG. 1. The coupler 20 includes a mixer element 1, which is positioned on a substrate 4 and has one end surface 21 and a second end surface 22 which as illustrated extend parallel to one another. A first group of fibers 2 abut against the end surface 21 while the second group of fibers 3 abut against the end surface 22. The mixer 1 and the two groups of fibers 2 and 3 are positioned on a surface of the substrate 4, which acts as means for positioning the mixing element 1 and the groups of fibers 2 and 3 in the same plane. It should be noted, that the mixing element has a waisted configuration which is formed by the edges 23 and 24 which extend between the end surfaces or edges 21 and 22 and have a concave configuration.

Figure 2:
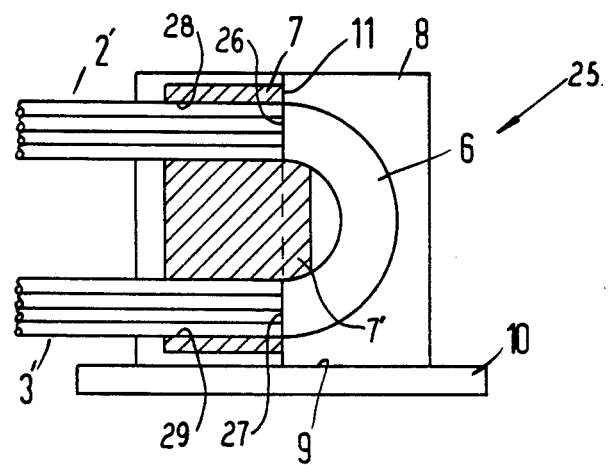
FIG. 2 is a plan view of a star coupler in accordance with the present invention having a semi-circular mixer element embodiment.

Another exemplary embodiment of the present invention is shown by a coupler generally indicated at 25 in FIG. 2. The coupler 25 is a star coupler which consists of a semi-circular mixing element 6 having end surfaces 26 and 27 which lie on the same plane. The bundles of fibers 2' and 3' abut against the end surfaces 26 and 27 respectively. The groups of fibers 2' and 3' and the element 6 are all fixed in a position relative to one another on the substrate 8 by means of a thick film structure 7. The substrate 8 has a straight limiting edge 9, which extends parallel to the groups of fibers 2' and 3' and as illustrated is abutted against a stop means 10.

The coupler 25 can be formed in the following manner. A thick film 7, which facilitates the precise positioning of the fibers and mixing element is applied on the surface of the substrate 8, and has fiber runs 28 and 29 extending parallel to the limiting edge 9. This obviates the need for a later adjustment of the end surfaces 26 and 27 of the mixing element 6 relative to the fiber groups 2' and 3'. The structure 7 is now aligned in such a manner that when the fibers are placed in the runs 28 and 29 they will extend parallel to the limiting edge 9 of the substrate. The substrate is now divided on a plane 11 on which lies the coupling point between the fiber groups 2' and 3' and the mixing element 6. The fiber groups are now inserted and glued in the fiber runs 28 and 29 of one of the halves of the substrate. The fiber end surfaces, which face towards the mixing element are polished until they are flushed with the substrate edge or plane 11. The two halves are joined together for example by an adhesive with the limiting edge 9 being placed against the common stop 10. The two halves of the thick film structure 7 thus reassume the original position relative to one another. Finally, the mixing element is secured in its position which has been predetermined by a portion 7' of the film structure 7.

Figure 3:
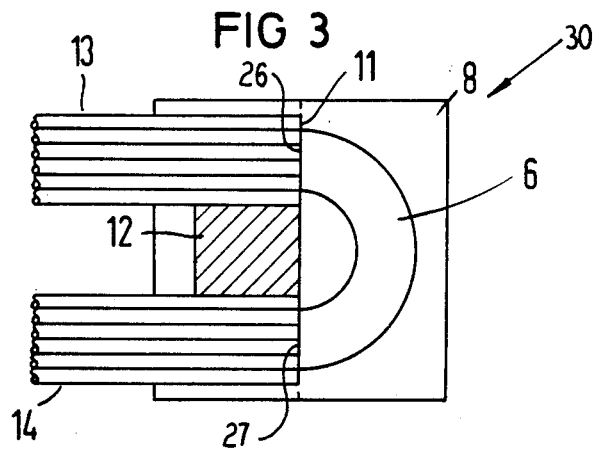
FIG. 3 is a plan view of another star coupler having a semi-circular mixer element where the fibers are adjusted respectively to the mixing element by a method different than that which was used in FIG. 2.

Another exemplary embodiment of the coupler is generally indicated at 30 in FIG. 3 and will differ somewhat from the embodiment of the coupler 25 of FIG. 2, however identical components have been provided with the same element number. In the embodiment of the coupler 30, a stop means 12 for a fiber is arranged on the surface of the substrate 8. Two fiber groups 13 and 14 which have more fibers than the width of the end surfaces 26 and 27 of the mixer element 6 are placed against the stop means. This considerably simplifies the coupling of the flat fiber rows to the mixing element 6. In practice, it is possible to dispense with the use of the thick film technique as the adjustment aid and the common stop means for the halves of the substrate. The fibers are merely placed against the stop means 12 and secured on the surface of the substrate 8. Before securing the fiber groups 13 and 14 on the substrate, the substrate 8 is cut along the plane 11. The end surfaces of the fibers 13 and 14 are then polished to be in the plane 11. The final steps are to assemble the substrate halves together and then simply align the mixing element against the fiber end surface with the end surfaces 26 and 27 being covered by fibers of the groups 13 and 14 respectively. This alignment can be easily done with the naked eye. In the final function test, those fibers which lie in the region of the end surfaces 26 and 27 of the mixer element are selected.

The above examples will already show that the mixer elements can be manufactured in a reproduceable manner and in large numbers by a simple process. A process has already been proposed whereby flat rows of fibers of virtually arbitrary widths can be produced cost favorably. With this purpose a large number of fibers having an appropriately thin coating are positioned next to one another on a substrate so that they contact each other. These fibers are then glued and sealed by a cover. This unit can be sawed up transversely to the direction which the fibers extend. The cut surfaces of the fibers are then polished and the individual components can then be cut up in the desired width along the fibers. The carrier for the mixing elements can also be produced from the same substrate. It is then merely necessary to connect the individual components with the fibers and the carrier together with the mixing elements.

With all of the above process steps, it is possible to produce star couplers having reproduceable properties in large numbers with cheap production cost. The simple technology used for this purpose assures that the insertion losses are small. In particular, the preferred forms of the mixer element contained in the exemplary embodiments illustrated in FIGS. 1-3 insures a very good mixing of all modes with overall small dimensions for the star coupler.

Although various minor modifications may be suggested by those versed in the art, it should be understood that we wish to embody within the scope of the patent granted hereon, all such modifications as reasonably and properly come within the scope of our contribution to the art.

We claim:

1. A method of forming an optical star coupler for the interconnection of one group of a plurality of multi-mode light conducting fibers arranged in a single layer on a substrate to a second group of multi-mode light conducting fibers arranged in a single layer on the substrate by a mixing element formed by a planar waveguide having a semi-circular shape, said method comprising the steps of providing a substrate, forming guide means for two separate groups of light conducting fibers on the surface of said substrate, cutting the substrate on a plane into two substrate portions with at least one of the portions having guide means for the two groups, positioning two groups of fibers in a layer of a single thickness on a surface of the one substrate portion utilizing said guide means, polishing the end of the fibers to the plane of the cut substrate portion, providing a semi-circular waveguide on the surface of the other substrate portion with the edges flush with a cut plane surface thereof, assembling the two substrate portions together with the edges of the semi-circular waveguide engaging the groups of fibers.

2. An optical coupler produced by the method of claim 1.

3. A method according to claim 1, wherein the step of forming guide means for the two groups comprises providing a single stop means on the surface of the substrate, said stop means having a surface for each of the groups of fibers, and wherein the step of positioning said groups of fibers positions groups of fibers having a width greater than the width of the semi-circular planar waveguide.

4. An optical coupler produced by the method of claim 3.

5. A method according to claim 1, wherein the step of forming guide means comprises applying a thick film having a fiber run for each group of fibers extending parallel to an edge of the substrate and terminating in a plane, said thick film having a portion extending past said plane, said step of cutting, cutting said substrate on said plane so that the other of the two substrate portions has a guide portion, said step of providing the semi-circular waveguide on said other substrate portion includes assembling said planar waveguide utilizing said guide portion and said step of assembling the two substrate portions positions the two portions with their edges on a guide surface to ensure alignment of the semi-circular waveguide and the fibers disposed in each of said runs.

6. An optical coupler produced by the method of claim 5.

* * * * *